United States Patent [19]

Klink et al.

[11] Patent Number: 4,909,807

[45] Date of Patent: Mar. 20, 1990

[54] WELDING AND BACKING RING ARRANGEMENT FOR AN ELECTRIC CELL

[75] Inventors: Rainer Klink, Kernen i.R.; Wolfgang Grothe, Reutlingen, both of Fed. Rep. of Germany

[73] Assignee: Deutsche Automobilgesellschaft mbH, Hanover, Fed. Rep. of Germany

[21] Appl. No.: 262,709

[22] Filed: Oct. 26, 1988

[30] Foreign Application Priority Data

Nov. 4, 1987 [DE] Fed. Rep. of Germany ....... 3737336

[51] Int. Cl.$^4$ .......................... H01M 6/00; B32B 3/12
[52] U.S. Cl. .................. 29/623.2; 29/623.4; 429/101; 429/174; 428/595; 428/596; 428/603
[58] Field of Search ....................... 429/101, 179, 177; 29/623.2, 623.4; 428/595, 596, 603

[56] References Cited

U.S. PATENT DOCUMENTS

| 2,715,193 | 8/1955 | Stnex | 428/596 X |
| 3,729,347 | 4/1973 | Brown et al. | 428/596 X |
| 4,420,545 | 12/1983 | Meyer et al. | 429/101 |
| 4,517,264 | 5/1985 | Miller et al. | 429/174 X |
| 4,546,054 | 10/1985 | Carr et al. | 429/101 |

FOREIGN PATENT DOCUMENTS 3520854 8/1986 Fed. Rep. of Germany .

*Primary Examiner*—Stephen J. Kalafut
*Attorney, Agent, or Firm*—Barnes & Thornburg

[57] ABSTRACT

A welding and backing ring arrangement for the connecting of two cylindrical enclosure parts of a flameproof enclosure of an electric cell having stacks of electrodes arranged symmetrically to the weld seam is described. The ring consists of a rectangular hollow profile section (box profile) with an outwardly directed, approximately equatorially arranged collar. The ring is advantageously produced from two identical ring halves which are connected mirror-invertedly and the meridian cross-section of which has a hat profile. To relieve the weight, the axially perpendicular areas may be provided with breakthroughs. The wall thickness of the welding ring is to be approximately 50% of the wall thickness of the flameproof enclosure.

19 Claims, 2 Drawing Sheets

WELDING AND BACKING RING ARRANGEMENT FOR AN ELECTRIC CELL

BACKGROUND AND SUMMARY OF THE INVENTION

The subject of the invention is a welding and backing ring for the connecting of two cylindrical enclosure parts of a flameproof enclosure of an electric cell (battery) having stacks of electrodes arranged symmetrically to the weld seam.

U.S. Pat. No. 4,546,054 and commonly assigned German Patent 3,520,854 disclose electric cell arrangements of the general type the present invention is directed toward improving.

Such electric cells are, for example, nickel hydrogen cells. They normally consist of a stack of electrodes which is surrounded by a flameproof, thin walled enclosure. In this case, the hydrogen is stored under high internal pressure (for example 60 bar). During discharging or charging of the cell, the hydrogen pressure decreases or increases, respectively, proportionally to the amount of charge taken or added. Due to these cyclical pressure fluctuations, the weld seam is subjected to a considerable load due to the pulsating internal pressure, it of course having to remain absolutely tight. The enclosure for such batteries consists of a flameproof cylindrical jacket which is made up of two enclosure halves joined by a radial connection welding. In order to prevent any damage to the stacks of electrodes by the welding heat, the weld seam is positioned such that, seen axially, it lies between two stacks of electrodes. The joining of the enclosure does not take place until the stacks of electrodes have been put in place; therefore, it must be reliably prevented that welding beads penetrate into the battery. For this purpose, the use of welding rings is known, which center the enclosure parts and cover the seam to be welded from the inside and thus prevent the penetration of welding beads into the enclosure. Since the welding ring is likewise welded to the enclosure during the welding of the enclosure halves, it additionally serves as radial reinforcement of the enclosure.

It is further known to use the welding ring additionally for holding the stacks of electrodes. For instance, the above-mentioned U.S. Pat. No. 4,546,054 discloses a welding ring for a symmetrical stack arrangement which has a T-shaped cross-section and is connected to inwardly directed metal plate rings. This welding/backing plate arrangement consists of three metal parts which fit well one into the other and consequently have to be fabricated with great accuracy. The construction is therefore expensive and relatively heavy. Because the metal plate rings are close to one another, if the cell is vibrated, for example during the rocket launch of a space capsule fitted with such a cell, there is a certain membrane effect, which can only be eliminated by relatively thick central insulating plates. This in turn increases the weight and makes the cells more expensive. In addition, due to the relatively close connection of the two stack halves, there is only a small thermal isolation, which can lead to problems.

The above-mentioned German Patent Specification 3,520,854 discloses a further embodiment of a welding ring which already has a means of holding the stacks of electrodes by tongue-shaped formations. Such cells are very suitable for conventional earth-bound applications. However, in testing under space travel conditions, such as occur for example during the launching of rockets, it has been found that the tongues can bend due to the vibrational forces occurring or that the stacks for their part vibrate, so that the destruction of the cells may ensue. The welding of the enclosure halves to each other and to the welding ring was carried out by the metal inert gas method (MIG). In this method, additional material is introduced to the weld location during welding via a welding wire. This has the advantage of a large weld upset formation, which contributes to the strength of the welded joint. There are, however, disadvantages in this method in the additional weight which is caused by the weld upset formation and is not justifiable in space deployment, and disadvantages on the other hand due to the fact that the upset is very inconvenient when fitting the cells in closely enclosing heat sinks.

The problem of introducing additional mass by the welding method can be avoided for example by carrying out the welding by the tungsten-inert gas method (TIG) or by plasma welding. These methods, however, require a much more accurate centering, in other words a more accurate concentricity and squareness of the enclosure parts and of the welding ring with respect to each other than in the case of the previously mentioned MIG welding method.

An object of the invention is to provide a welding and backing ring which has a high accuracy in terms of concentricity and squareness, which combines a high axial and radial strength or rigidity with low weight, which makes possible a high centering accuracy with respect to the stacks of electrodes and enclosure parts and which can be welded to the enclosure parts with small weld seam upset formation.

This object is achieved by providing a welding and backing ring which has a rectangular hollow profile section with an outwardly directed, approximately equatorially arranged collar.

The welding and backing ring is accordingly designed such that it has a rectangular hollow profile section with an outwardly directed, approximately equatorially arranged collar. Since the ring consequently represents a box profile, the wall thickness can be kept very thin. The equatorially arranged, outwardly directed collar serves on the one hand as stop for the enclosure halves of the cell enclosure and on the other hand as material supplier in the welding. The ring preferably consists of two identical rings which are connected mirror-invertedly and the meridian cross-section of which has a hat profile. These rings with hat profile may be made relatively simply from sheet metal by deep drawing. They are placed centrally one on the other and connected to each other, for example by welding, to form the box profile. To save weight and to facilitate the gas exchange within the cell, it is advantageous to provide the axially perpendicular areas of the ring with breakthroughs. These breakthroughs may be of circular or rectangular shape. In cases where requirements concerning the strength of the ring are relatively low, holes may also be made in the inner, axially parallel areas of the ring to save weight.

The wall thickness of the welding ring is to be dimensioned such that the welding ring achieves an optimum strength with lowest possible weight. Here of course the size of the flameproof enclosure also plays a part, and consequently the sheet thickness for the flameproof enclosure. It has been found that optimum results are achieved if the wall thickness of the welding ring is equivalent to approximately 50% of the wall thickness of the flameproof enclosure in the cylindrical region. The height of the welding ring in axial direction is to be equivalent to approximately 15 to 30 times, preferably approximately 20 times, the wall thickness of the welding ring. Furthermore, the radially measured width of the welding ring cross-section is to be approximately 5 to 20%, preferably approximately 10% of the enclosure diameter in the cylindrical region. The outwardly directed, approximately equatorially arranged collar is to protrude by approximately 3 times the wall thickness of the welding ring.

Other objects, advantages and novel features of the present invention will become apparent from the following detailed description of the invention when considered in conjunction with the accompanying drawings.

DETAILED DESCRIPTION OF THE DRAWINGS

Figure 1:
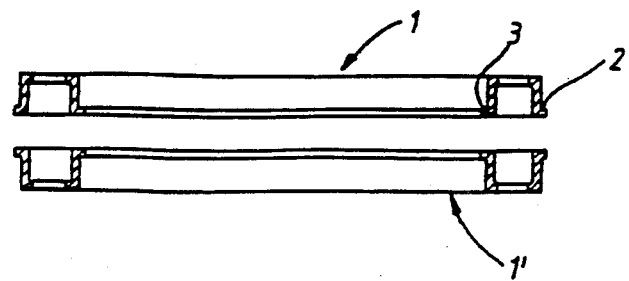
FIG. 1 is a sectional side view schematically depicting two part-halves of a welding ring, the meridian cross-section of which has a hat profile, constructed in accordance with a preferred embodiment of the invention.
Figure 2:
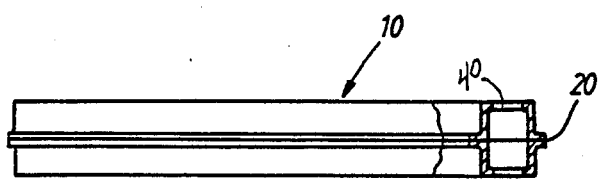
FIG. 2 is a side part sectional view of a complete welding ring constructed utilizing the halves depicted in FIG. 1.

In FIG. 1, two welding ring halves 1 and 1' are shown, as they have been produced prior to joining together. One half consists of a ring, the meridian cross-section of which has a hat profile, with outwardly and inwardly formed edges 2 and 3. The ring is produced by deep drawing and, with the exception of the small deviations due to the production process, has the same wall thicknesses everywhere. The two halves 1 and 1' are absolutely symmetrical, i.e. they are the same components in each case. The two halves are brought together by means of a centering device and joined together undetachably, for example by means of spot welding or another customary method of connection, on the inner edge 3. It is preferred here if the connection is only made on the inner edge, since this avoids any deformation of the outer edge 2 caused by any connecting techniques and the edge is after all welded at this location later during the welding of the welding ring to the enclosure. The joining of the two part-halves produces a welding ring 10 with a rigid box-like cross-section, as can be seen in FIG. 2. As can also be seen in FIG. 2, the ring halves 1, 1' of the welding ring 10 are provided with weight relief holes 40 and the equatorially arranged, outwardly directed collar 20 is twice as thick as the wall thickness of the welding ring.

Figure 3:
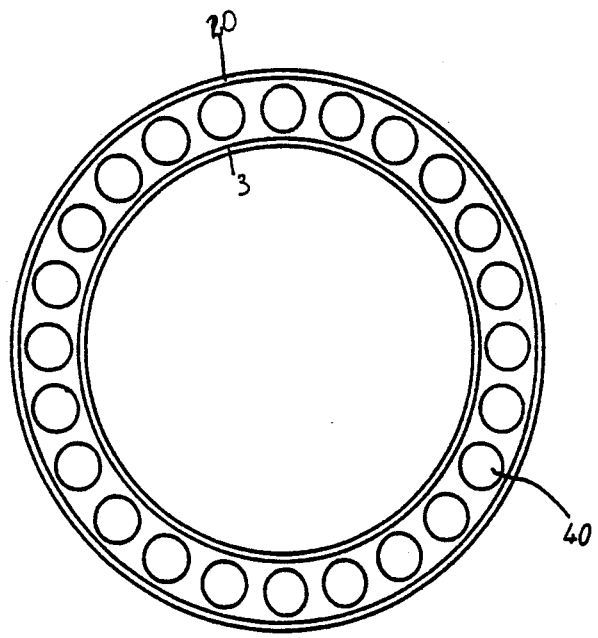
FIG. 3 is a plan view of the welding ring of FIGS. 1 and 2.

FIG. 3 shows the plan view of such a welding ring. Circular weight relief holes 40 are made in the axially perpendicular areas of the welding ring. They serve both to reduce weight and for the gas exchange within the cell. As shown in FIGS. 2 and 3, the radially measured width of the welding ring cross-section is approximately 10% of the outside diameter of the welding ring or, in other words, of the enclosure diameter of the cell enclosure in the cylindrical region. This ensures a good abutment of the adjoining cell parts, in particular of the insulating plates on the welding ring, and consequently guards them against excessive mechanical loading due to contact pressure and dynamic forces. On the other hand, this has the effect that the weight of the welding ring, which consists of metal and it being preferred that the material of the welding ring is the same as the container material, is kept very small due to the narrow edge. The height of the welding ring in axial direction is equivalent to approximately 20 times the wall thickness of the welding ring. As a result, a destruction of the neighboring cell parts due to overheating during welding is avoided.

Figure 4:
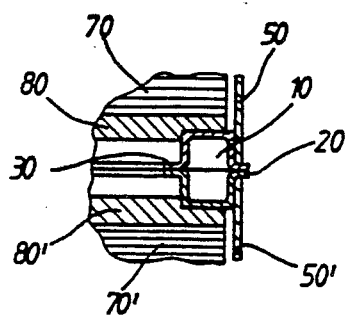
FIG. 4 is a partial schematic view showing a cutout of the enclosure-welding ring bond of FIGS. 1-3 in position assembled in a battery before welding.
Figure 5:
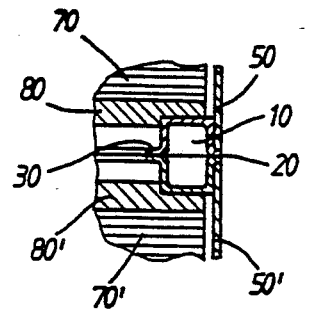
FIG. 5 shows the cutout according to FIG. 4 after welding.

In FIGS. 4 and 5, a cutout of an enclosure welding bond before and after welding is shown. As emerges from FIG. 4, the inside diameter of the enclosure halves 50 and 50' is equal to the outside diameter of the welding ring 10 apart from a small fitting clearance. This produces a very good centering between these parts and on the other hand an excellent support against bending, so that the membrane effect mentioned above cannot occur. The cell stacks 70 and 70' bear via the insulating plates 80 and 80' against the welding ring 10 and are centered by it. The collar 20 is dimensioned such that it protrudes by approximately 3 times the wall thickness of the welding ring from the welding ring and, in the assembled state, prior to welding, protrudes between two enclosure halves by approximately half the enclosure wall thickness from the enclosure. This is beneficial for avoiding a need for feeding of filler in welding by the inexpensive tungsten-inert gas (TIG) or plasma welding method. If these dimensions are maintained, weld seams can thereby be produced which do not stand out from the outside diameter of the cell, as is shown in FIG. 5, and which ensure a satisfactory connection of all adjoining parts. The inner edge 30 of the welding and backing ring is not so critical in its dimensions as the outer ring. The extent of the edge depends on the chosen method of joining, such as spot welding, riveting, flanging, etc. It of course, also serves for reinforcement and can prevent the inner cylinder part of the welding ring yielding under load. Here it has also been found that it is particularly beneficial if the inner edge 30 extends inwardly approximately 3 times the wall thickness of the welding ring.

Figure 6:
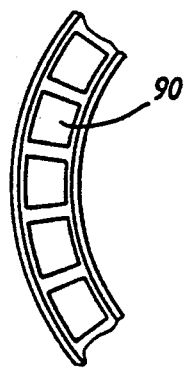
FIG. 6 is a plan view of a piece of a welding ring with rectangular clearances, constructed according to another preferred embodiment of the invention.
Figure 7:
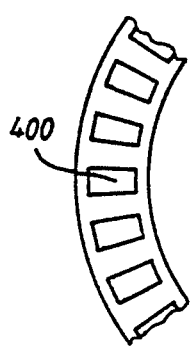
FIG. 7 is a partial plan view of a blank for forming a hat profile ring according to preferred embodiments of the invention.
Figure 8:
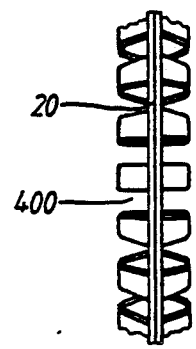
FIG. 8 shows a partial side view of a welding ring which consists of two hat profiles produced from blanks according to FIG. 7.

FIG. 6 shows a partial plan view of a welding ring with rectangular clearances 90. FIG. 7 shows a plan view of a blank, having through holes 400, from which a hat profile according to FIG. 1 is to be drawn. The blank is already provided with the weight saving openings 400 before shaping. After shaping of the blank into a hat profile, two hat profiles are joined together to form a welding and backing ring, such as is shown in partial side view in FIG. 8.

Of course, it must be ensured when dimensioning the clearances 400 that a sufficiently great ridigity and strength of the finish welding ring is preserved.

The clearances 40 according to FIG. 3 or 90 according to FIG. 6 may be made both before and after the drawing of the hat profile, while those according to FIG. 7 are advantageously made already before the shaping into the disc.

With the aid of the welding and backing ring described, a satisfactory connection of the cell halves and support of the stacks of electrodes is successfully achieved even under high static and dynamic loads. For example, a welding ring having a wall thickness of 0.3 mm and an outside diameter of 89 mm, which was intended for a cell of 89 mm inside diameter and a wall thickness of 0.6 mm, was able to be loaded axially with over 40 KN before it deformed. A welded cell enclosure produced with the aid of this ring withstood over 120,000 pressure cycles between 45 bar (atmospheres) and 55 bar without damage. Vibration tests on complete 50 Ah cells under space conditions were also understood without damage. In these cases, the weight of the welding and backing ring was only 1.35% with respect to the complete cell weight.

The new welding ring allows not only the satisfactory construction of a cell with symmetrically arranged stacks, but, precisely due to its excellent torsionally rigidity, also the construction of cells with stacks of electrodes arranged on one side.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Welding and backing ring for the connecting of two cylindrical enclosure parts of a flameproof enclosure of an electric cell having stacks of electrodes arranged symmetrically to the weld seam, wherein the welding ring has a rectangular hollow profile section with an outwardly directed, approximately equatorially arranged collar.

2. Welding and backing ring according to claim 1, wherein the welding ring consists of two identical rings which are connected mirror-invertedly and the meridian cross-section of which has a hat profile.

3. Welding and backing ring according to claim 1, wherein axially perpendicular areas of the welding ring are provided with breakthroughs.

4. Welding and backing ring according to claim 1, wherein the wall thickness of the welding ring is equivalent to approximately 50% of the wall thickness of the flameproof enclosure in the cylindrical region.

5. Welding and backing ring according to claim 1, wherein the height of the welding ring in axial direction is between 15 and 30 times the wall thickness of the welding ring.

6. Welding and backing ring according to claim 1, wherein the radially measured width of the welding ring cross-section is equivalent of between 5% and 20% of the enclosure diameter in the cylindrical region.

7. Welding and backing ring according to claim 1, wherein the collar protrudes by approximately 3 times the wall thickness of the welding ring.

8. Welding and backing ring according to claim 5, wherein the height of the welding ring in axial direction is approximately 20 times the wall thickness of the welding ring.

9. Welding and backing ring according to claim 6, wherein the radially measured width of the welding ring cross-section is approximately 10% of the enclosure diameter of the cylindrical region.

10. Welding and backing ring according to claim 5, wherein the radially measured width of the welding ring cross-section is equivalent of between 5% and 20% of the enclosure diameter in the cylindrical region.

11. Welding and backing ring according to claim 10, wherein the collar protrudes by approximately 3 times the wall thickness of the welding ring.

12. Method of making an electric battery comprising the steps of:
   welding a pair of cylindrical enclosure parts together via a weld seam at a welding and backing ring to form a firerproof enclosure having a cylindrical part, and
   providing the welding ring with a rectangular hollow profile section with an outwardly directed, approximately equatorially arranged collar.

13. Method of making an electric battery of the type according to claim 12, wherein the step of providing the welding ring further includes forming the welding ring of two identical rings each having a hat shaped cross-section, and connecting the two identical rings mirror-invertedly.

14. Method of making an electric battery of the type according to claim 13, further comprising the step of providing axially perpendicular areas of the welding ring with with breakthroughs.

15. Method of making an electric battery of the type according to claim 14, wherein the step of providing the welding ring further includes forming a wall thickness of the welding ring equivalent to approximately 50% of a wall thickness of the flameproof enclosure in the cylindrical region.

16. Method of making an electric battery of the type according to claim 12, wherein the step of providing the welding ring further includes forming a height of the welding ring in axial direction between 15 and 30 times a wall thickness of the welding ring.

17. Method of making an electric battery of the type according to claim 12, wherein the step of providing the welding ring further includes forming a radially measured width of the welding ring cross-section equivalent to between 5% and 20% of an enclosure diameter in the cylindrical region.

18. Method of making an electric battery of the type according to claim 16, wherein the step of providing the welding ring further includes forming the radially measured width of the welding ring cross-section equivalent to between 5% and 20% of the enclosure diameter in the cylindrical region.

19. Method of making an electric battery of the type according to claim 18, wherein the step of providing the welding ring further includes forming the collar to protrude by approximately 3 times a wall thickness of the welding ring.

* * * * *